United States Patent
Kim et al.

(10) Patent No.: US 10,415,536 B2
(45) Date of Patent: Sep. 17, 2019

(54) MOVING WINDOW FRAME WITH MULTIPLE WINDOWS AND ITS APPLICATION IN THE OCEAN, RIVER, AND WIND

(71) Applicants: Chong Hun Kim, Fountain Valley, CA (US); Jennifer Jinhee Kim, Fountain Valley, CA (US); David Kemhoe Kim, Fountain Valley, CA (US)

(72) Inventors: Chong Hun Kim, Fountain Valley, CA (US); Jennifer Jinhee Kim, Fountain Valley, CA (US); David Kemhoe Kim, Fountain Valley, CA (US)

(73) Assignees: Chong Hun Kim, Fountain Valley, CA (US); Jennifer J. Kim, Culver City, CA (US); David K. Kim, Portland, OR (US)

( * ) Notice: Subject to any disclaimer, the term of this patent is extended or adjusted under 35 U.S.C. 154(b) by 187 days.

(21) Appl. No.: 15/100,602

(22) PCT Filed: Dec. 31, 2013

(86) PCT No.: PCT/US2013/078557
§ 371 (c)(1),
(2) Date: May 31, 2016

(87) PCT Pub. No.: WO2015/102625
PCT Pub. Date: Jul. 9, 2015

(65) Prior Publication Data
US 2016/0298595 A1    Oct. 13, 2016

(51) Int. Cl.
*F03B 17/06* (2006.01)
*F03B 9/00* (2006.01)
*F03B 13/14* (2006.01)
*F03D 9/11* (2016.01)
*F03D 5/02* (2006.01)
(Continued)

(52) U.S. Cl.
CPC .............. *F03B 13/141* (2013.01); *F03B 3/12* (2013.01); *F03B 13/10* (2013.01); *F03B 17/06* (2013.01); *F03B 17/066* (2013.01); *F03D 5/02* (2013.01); *F03D 9/11* (2016.05); *F03D 9/25* (2016.05); *F05B 2240/218* (2013.01);
(Continued)

(58) Field of Classification Search
CPC ........ F03B 13/10; F03B 13/141; F03B 17/06; F03B 17/066; F03B 3/12; F03D 5/02; F03D 9/11; F03D 9/25; F05B 2240/218; Y02E 10/28; Y02E 10/38; Y02E 10/70; Y02E 10/725
See application file for complete search history.

(56) References Cited

U.S. PATENT DOCUMENTS 646,712 A * 4/1900 Symons .................... B63H 1/04
                                                          416/119
646,713 A * 4/1900 Symons .................... B63H 1/04
                                                          416/119
(Continued)

*Primary Examiner* — Tulsidas C Patel
*Assistant Examiner* — S. Mikailoff

(57) ABSTRACT

This invention has to do with generating electricity by converting kinetic energy embedded in the water in motion such as ocean waves, or river flow, or wind pressure into rotational energy which is to be used to rotate the electricity generator spin axis to generate electricity. To achieve this goal, Moving Window Frame with multiple Vertical Windows and with or without a Horizontal Window is invented.

1 Claim, 18 Drawing Sheets

(51) Int. Cl.
*F03B 3/12* (2006.01)
*F03B 13/10* (2006.01)
*F03D 9/25* (2016.01)

(52) U.S. Cl.
CPC .............. *Y02E 10/28* (2013.01); *Y02E 10/38* (2013.01); *Y02E 10/70* (2013.01); *Y02E 10/725* (2013.01)

(56) References Cited

U.S. PATENT DOCUMENTS

| | | | | |
|---|---|---|---|---|
| 849,311 A * | 4/1907 | Auld | | F03B 17/066 416/10 |
| 870,225 A * | 11/1907 | Campbell et al. | | F03B 17/066 416/8 |
| 1,034,603 A * | 8/1912 | Farley | | F03B 17/066 405/75 |
| 1,469,064 A * | 9/1923 | Zucker | | F03D 3/049 415/4.4 |
| 2,378,966 A * | 6/1945 | Alcantara | | F03B 13/1835 405/76 |
| 3,927,330 A * | 12/1975 | Skorupinski | | F03B 17/066 290/54 |
| 3,973,864 A * | 8/1976 | Atherton | | F03B 13/184 415/8 |
| 3,992,125 A * | 11/1976 | Schilling | | F03B 17/068 415/5 |
| 4,104,536 A * | 8/1978 | Gutsfeld | | F03B 17/063 290/54 |
| 4,134,710 A * | 1/1979 | Atherton | | F03B 17/065 290/53 |
| 4,224,527 A | 9/1980 | Thompson | | 290/54 |
| 4,270,056 A | 5/1981 | Wright | | 290/54 |
| 4,494,008 A * | 1/1985 | Patton | | F01D 23/00 290/44 |
| 4,534,703 A * | 8/1985 | Flavell | | F03D 3/068 416/119 |
| 4,818,888 A | 4/1989 | Lenoir, III | | 290/43 |
| 5,256,034 A * | 10/1993 | Sultzbaugh | | F03D 3/061 415/914 |
| 5,789,826 A * | 8/1998 | Kumbatovic | | F03B 13/1835 290/43 |
| 6,023,105 A | 2/2000 | Youssef | | 290/54 |
| 6,109,863 A * | 8/2000 | Milliken | | F03B 17/065 415/1 |
| 6,396,162 B1 | 5/2002 | Carrillo | | 290/43 |
| 6,734,576 B2 * | 5/2004 | Pacheco | | B60K 16/00 290/55 |
| 6,809,430 B2 * | 10/2004 | Diederich | | F03B 17/066 290/54 |
| 6,861,766 B2 | 3/2005 | Rembert | | 290/43 |
| 7,084,521 B1 | 8/2006 | Martin | | 290/54 |
| 7,299,628 B2 | 11/2007 | Buller | | 60/398 |
| 7,471,006 B2 * | 12/2008 | Janca | | F03B 17/062 290/43 |
| 7,478,974 B1 | 1/2009 | Kelly | | 405/78 |
| 7,785,065 B2 * | 8/2010 | Clemens | | F03B 17/066 290/54 |
| 7,847,425 B2 * | 12/2010 | Lok | | F03B 13/26 290/42 |
| 7,862,290 B2 * | 1/2011 | Diederich | | F03B 17/066 415/5 |
| 8,344,540 B2 * | 1/2013 | Kim | | B63H 21/20 290/53 |
| 8,378,517 B2 * | 2/2013 | Lee | | F03B 17/068 290/54 |
| 8,664,784 B2 * | 3/2014 | Janca | | F03B 13/10 290/43 |
| 8,672,608 B2 * | 3/2014 | Chio | | F03D 3/005 415/4.2 |
| 8,890,353 B2 * | 11/2014 | Cunnane | | F03B 13/10 290/54 |
| 9,222,460 B2 * | 12/2015 | Petrounevitch | | F03B 17/066 |
| 9,689,369 B2 * | 6/2017 | Sieber | | F03B 13/264 |
| 2005/0141994 A1 * | 6/2005 | Joo | | F03D 3/02 416/132 B |
| 2008/0296899 A1 * | 12/2008 | Janca | | F03B 17/062 290/54 |
| 2008/0303284 A1 * | 12/2008 | Clemens | | F03B 17/066 290/54 |
| 2009/0066088 A1 * | 3/2009 | Liang | | F03D 3/067 290/55 |
| 2009/0092490 A1 * | 4/2009 | Brooks | | F03D 3/0409 416/24 |
| 2010/0289264 A1 * | 11/2010 | Lee | | F03B 17/068 290/44 |
| 2010/0301609 A1 * | 12/2010 | Kim | | F03B 17/065 290/54 |
| 2012/0043764 A1 * | 2/2012 | Kim | | B63H 21/20 290/55 |
| 2016/0281507 A1 * | 9/2016 | Tso | | F03B 17/065 |
| 2016/0298595 A1 * | 10/2016 | Kim | | F03D 5/02 |

* cited by examiner

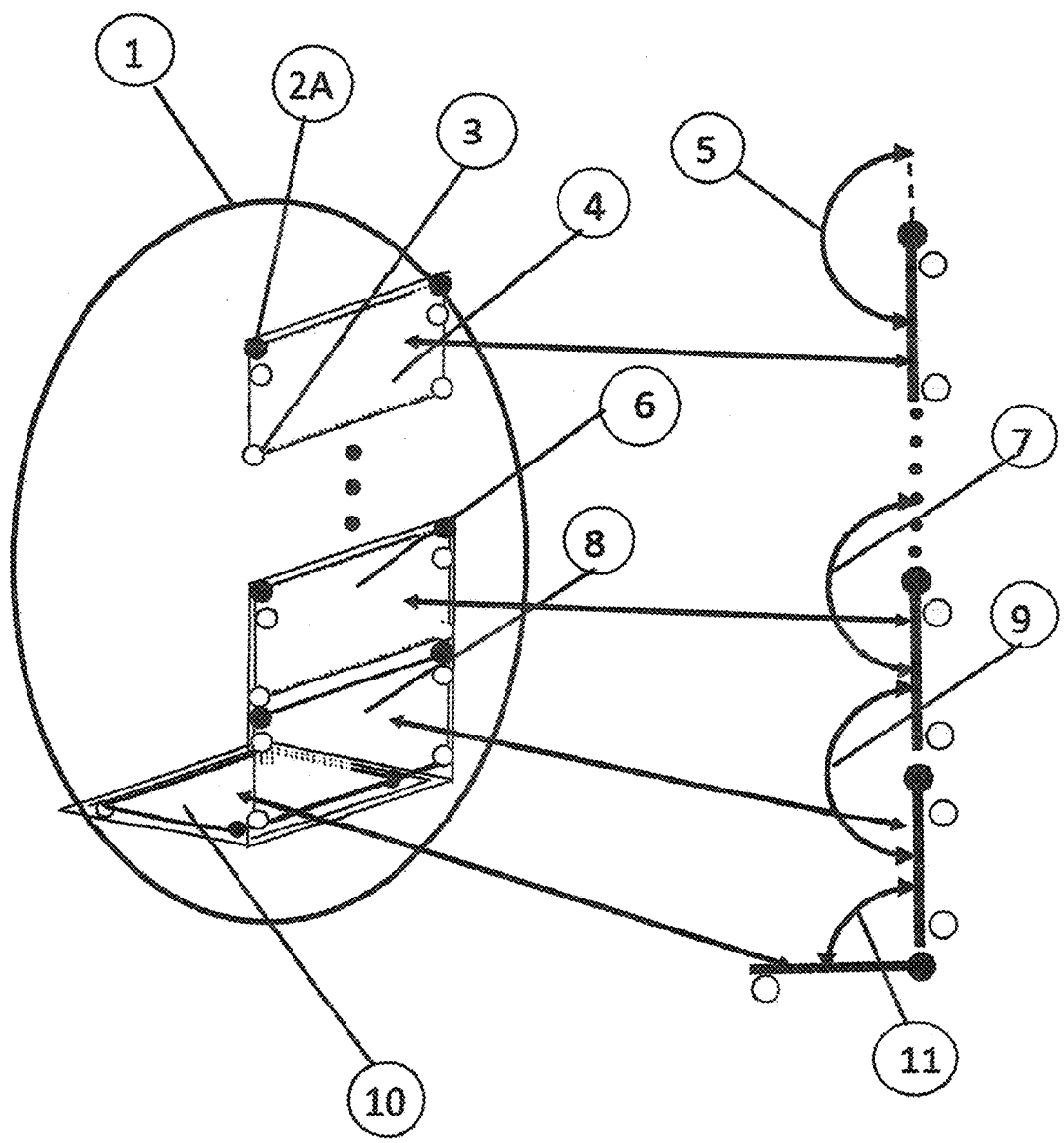
Fig. 1A Moving Window Frame Structure with Multiple Horizontal Window

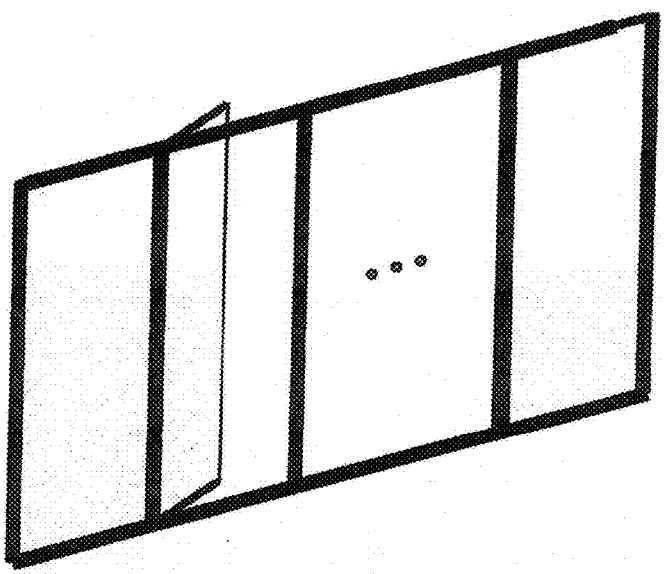
Fig. 1B Moving Window Frame Structure with Multiple Vertical Windows and No Horizontal Window

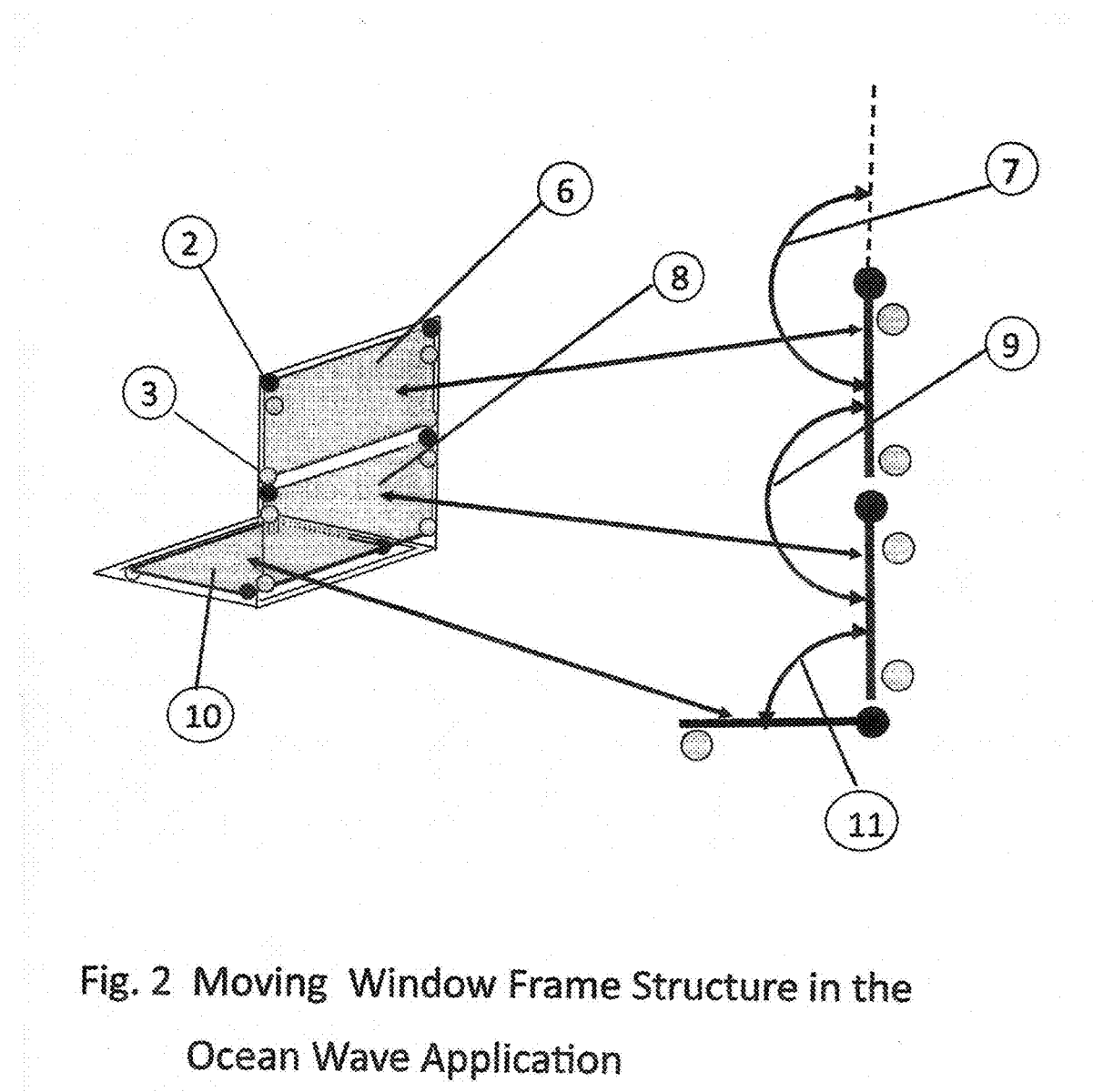
Fig. 2 Moving Window Frame Structure in the Ocean Wave Application

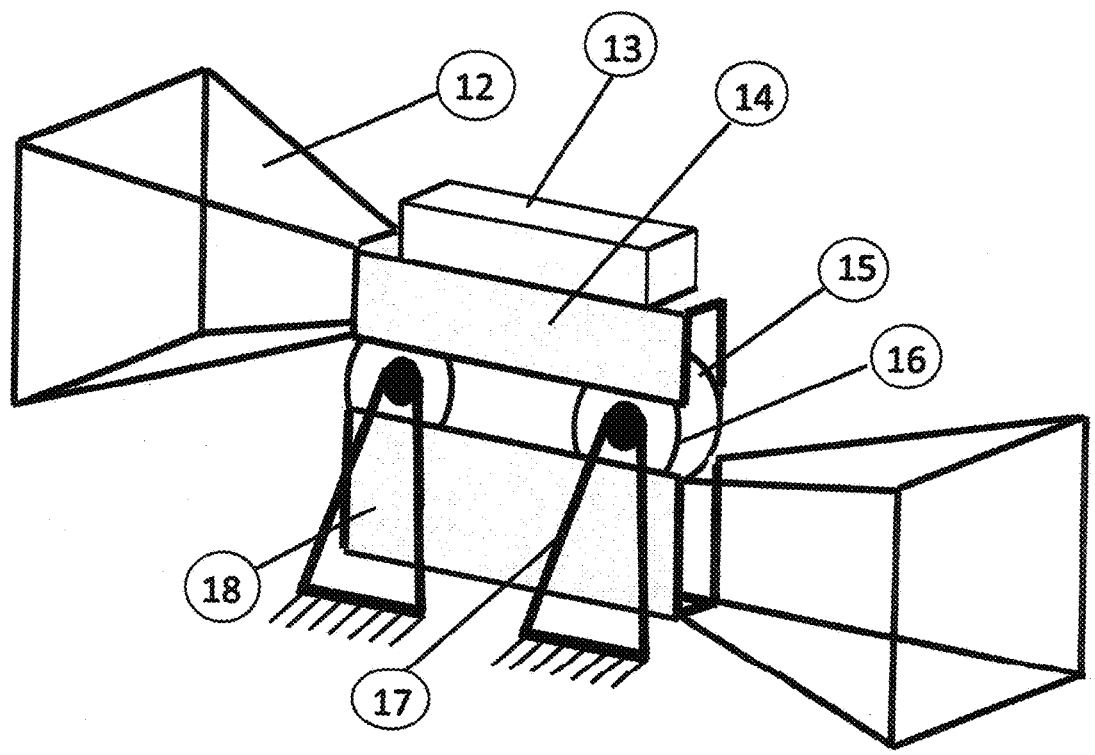
Fig. 3 Ocean Wave Energy Converter Structure

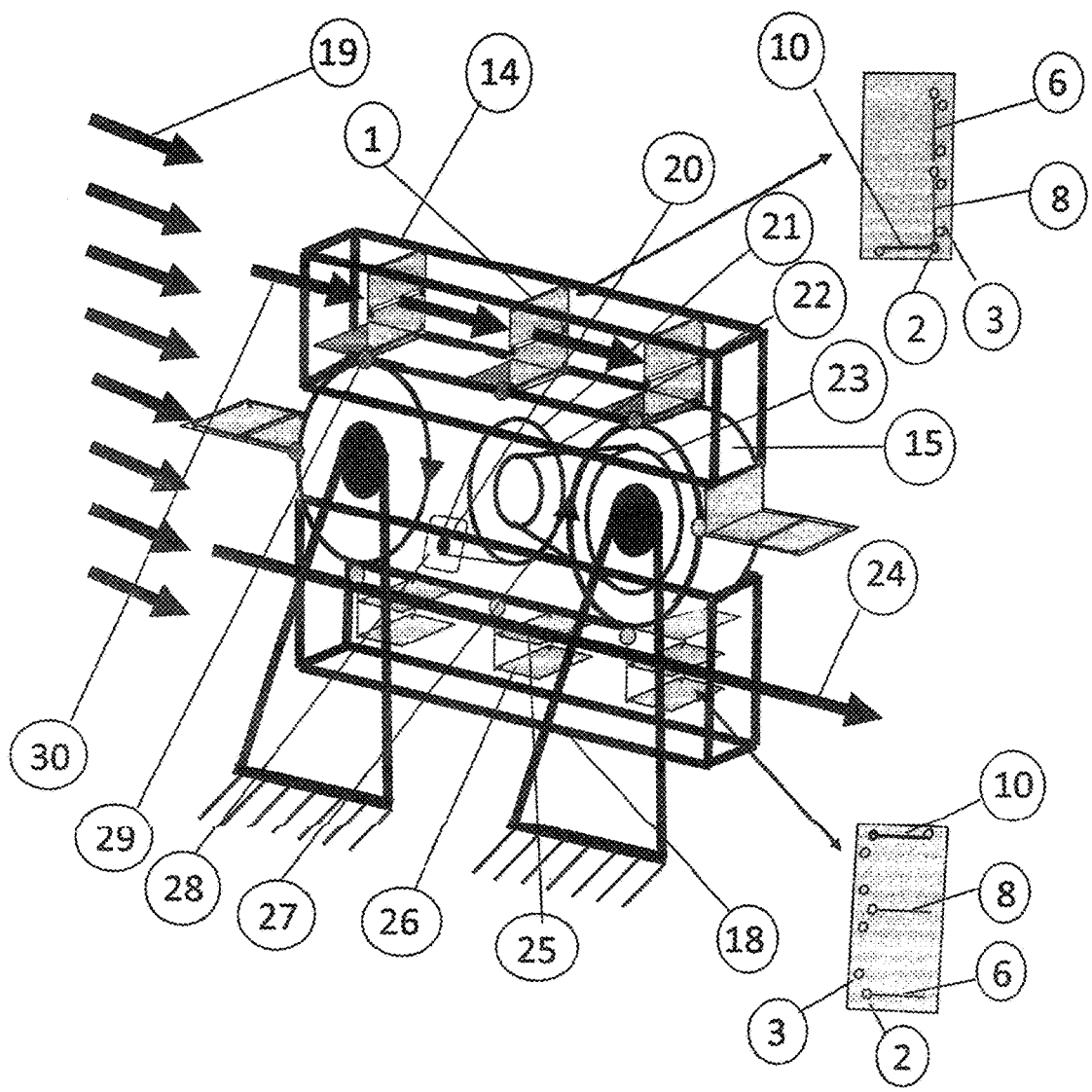
Fig. 4 Water Motion from Left to Right

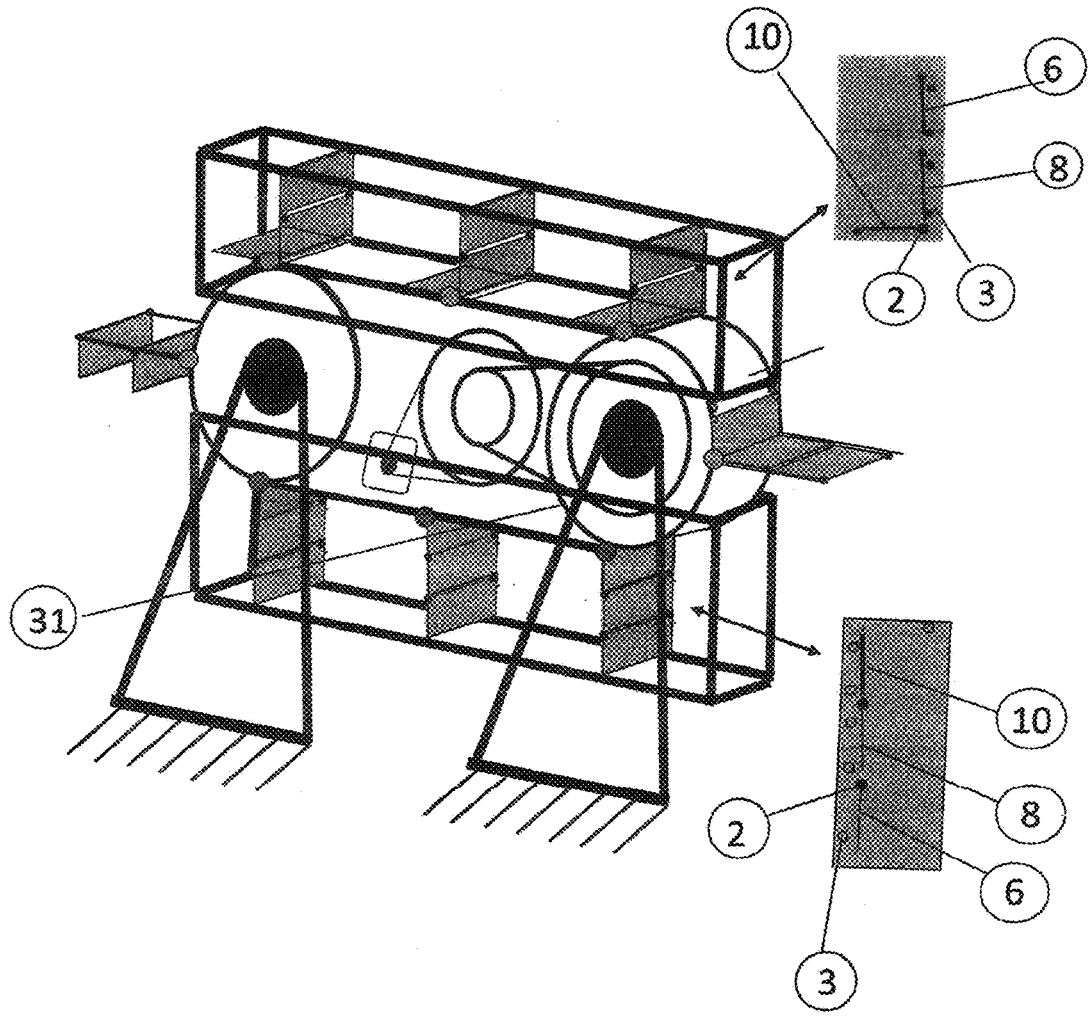
Fig. 5 No Wave Motion

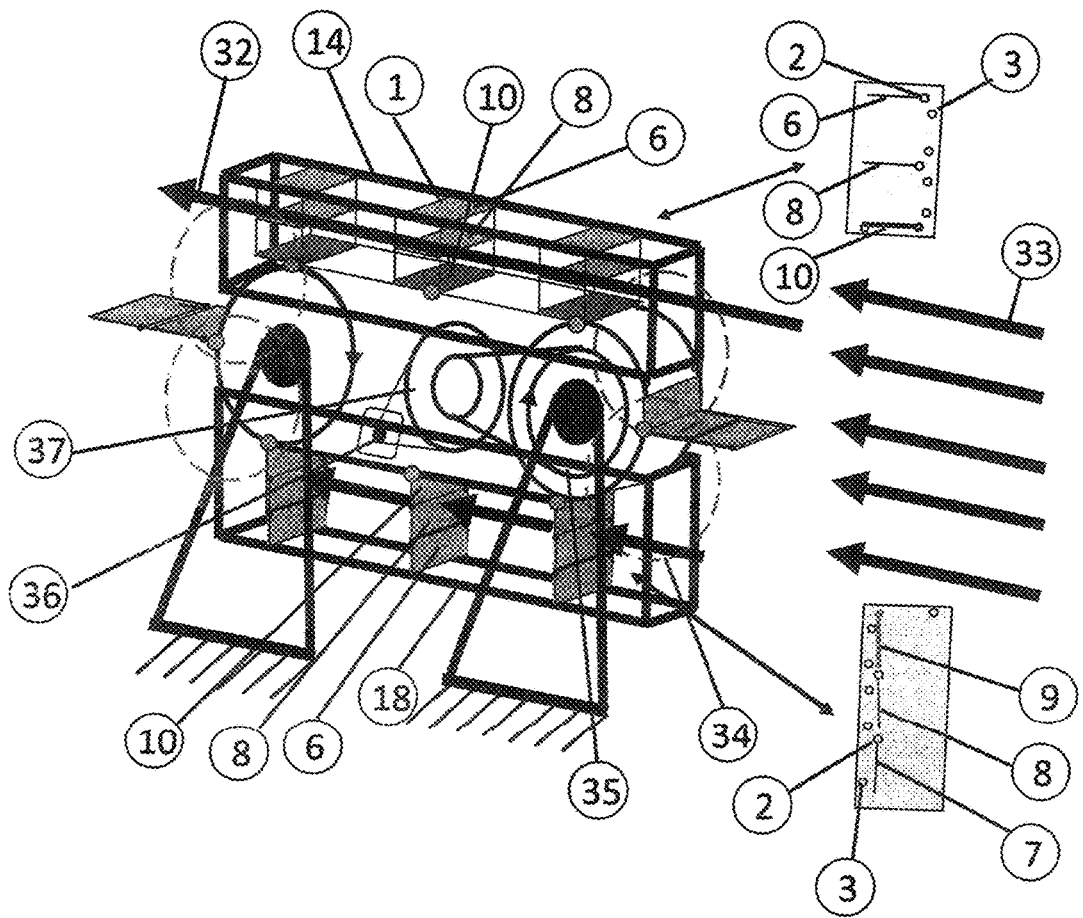
Fig. 6 Wave Motion from Right to Left

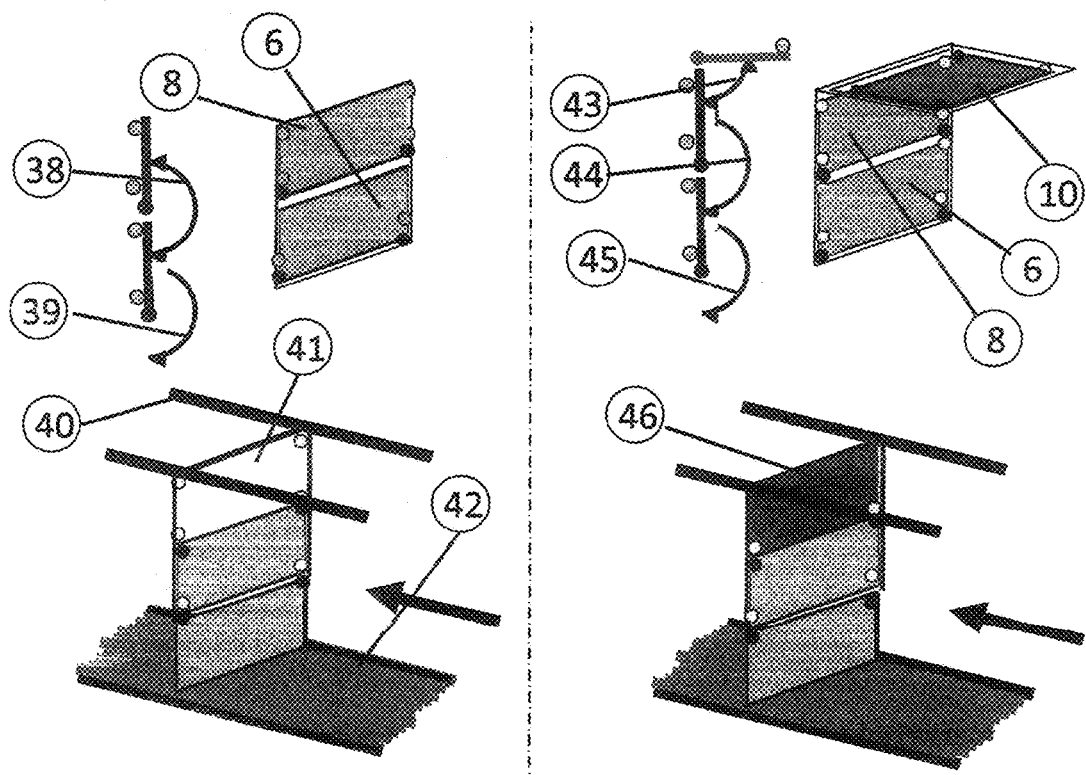

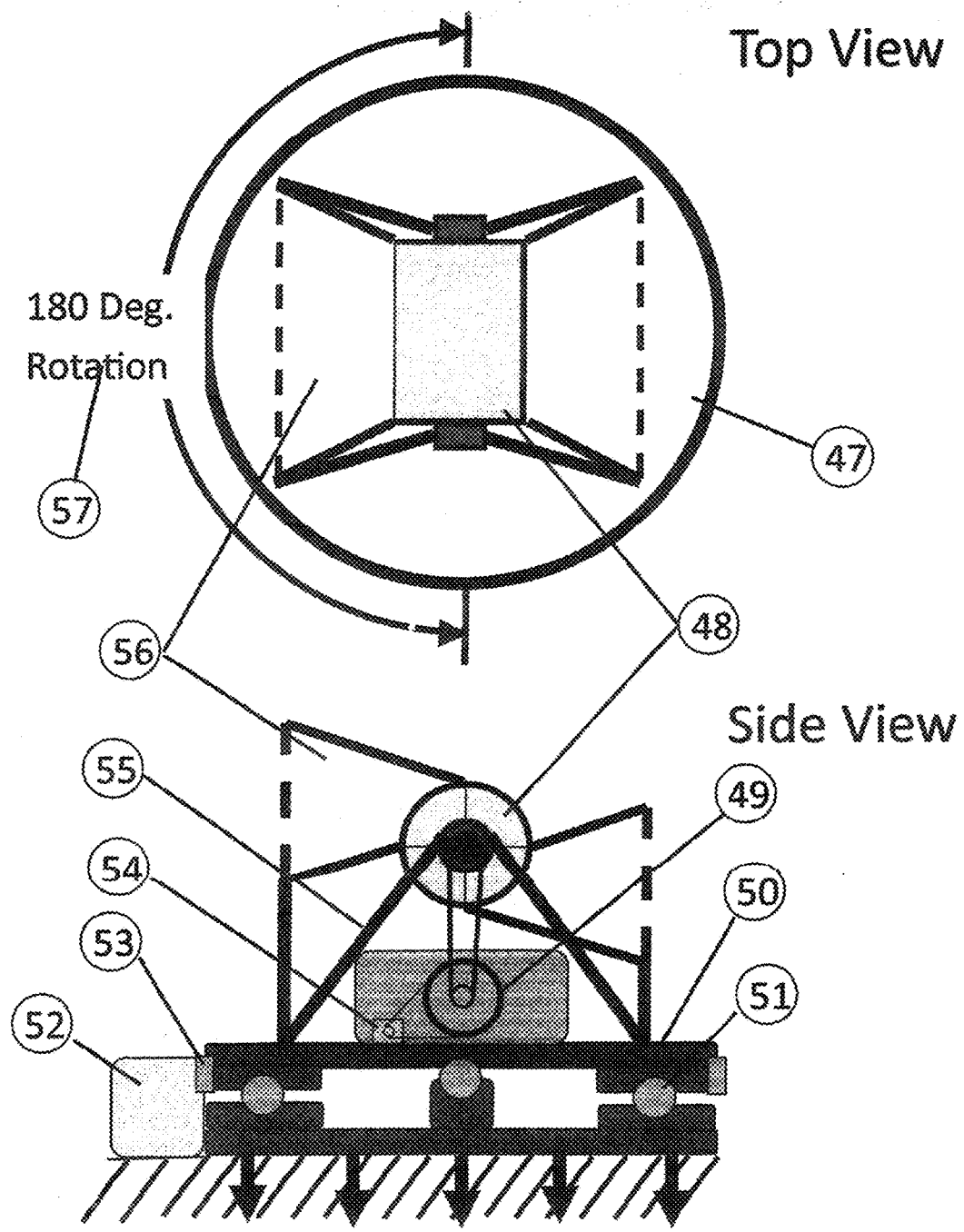
Fig. 9 Wind Energy Converter Structure

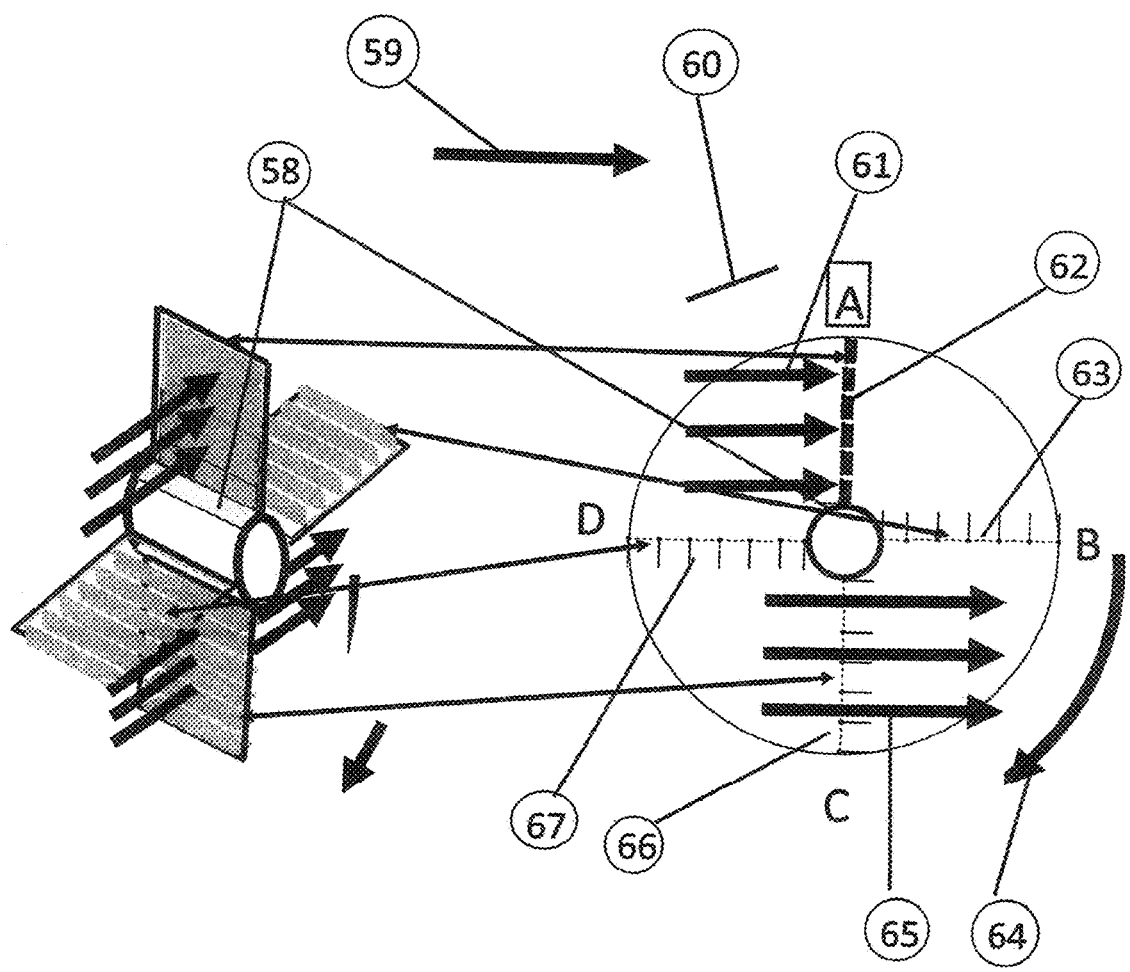
Fig. 10 Wind Blow from Left to Right

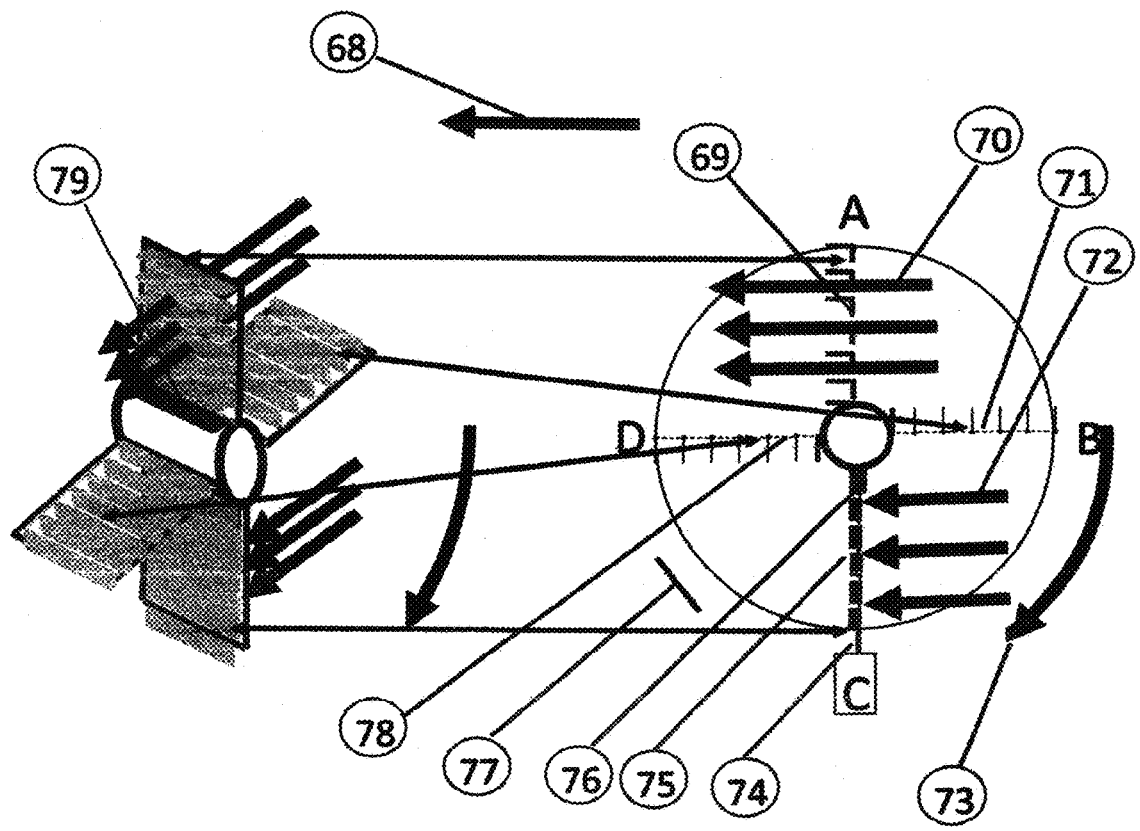
Fig. 11 Wind Blow from Right to Left

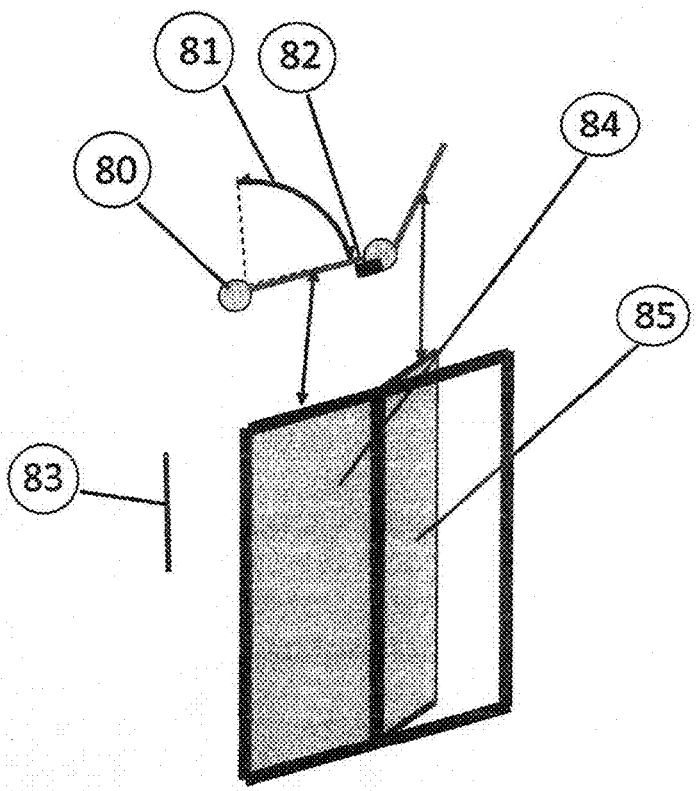
Fig. 12 Moving Window Frame with Two Vertical Windows (to be used in Fig. 14 and Fig. 15)

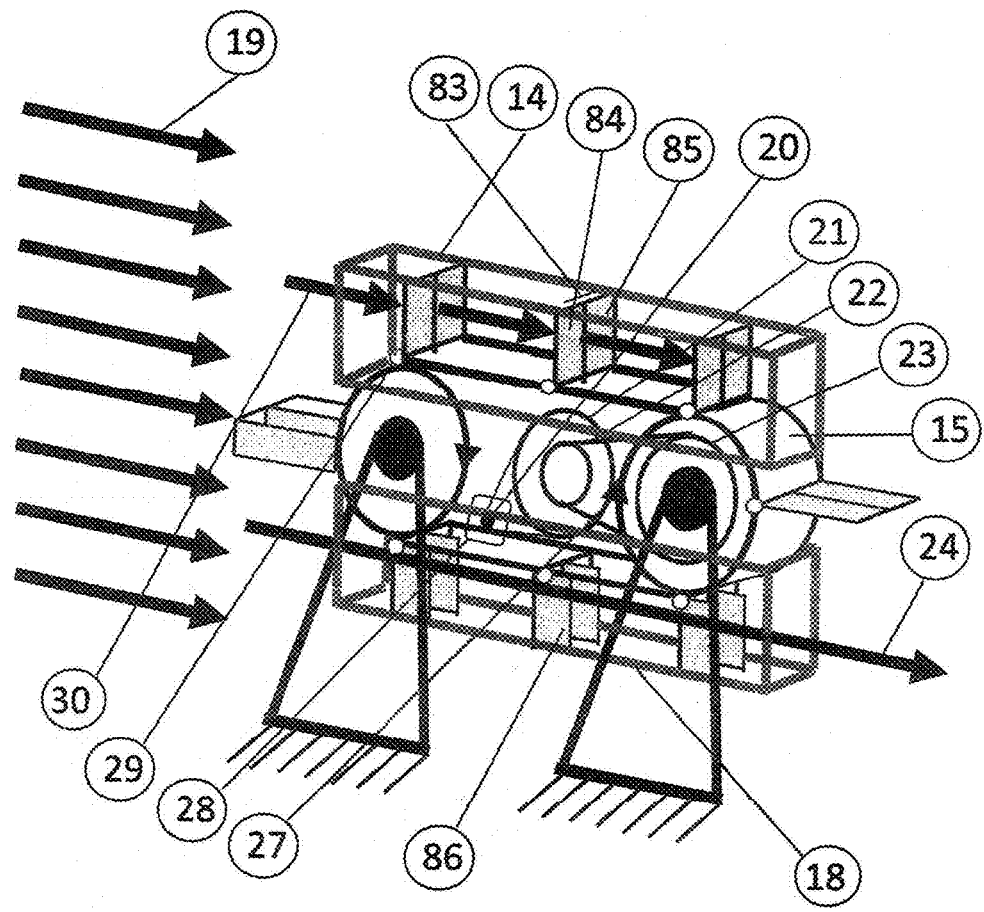
Fig. 13 Ocean Wave Motion from Left to Right, Vertical

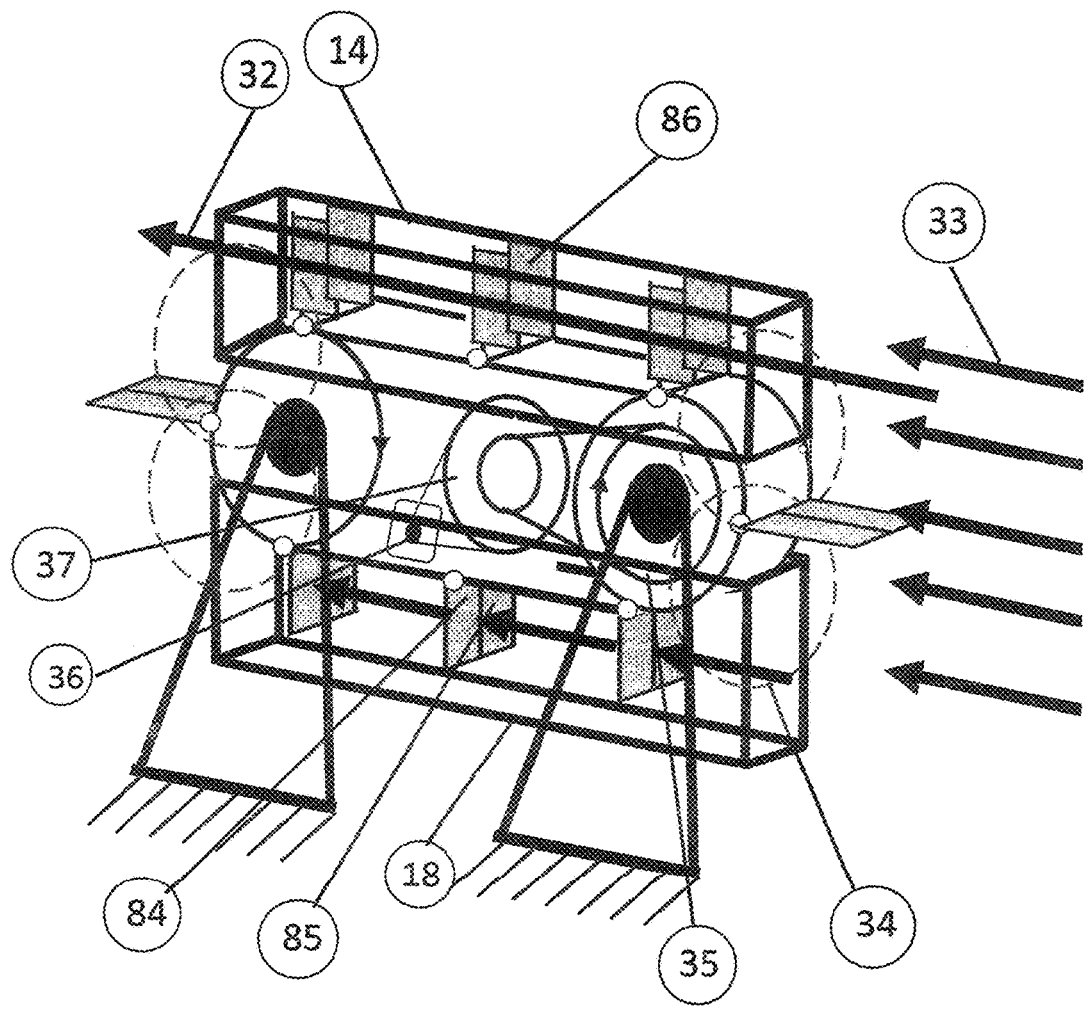
Fig. 14 Wave Motion from Right to Left, Vertical

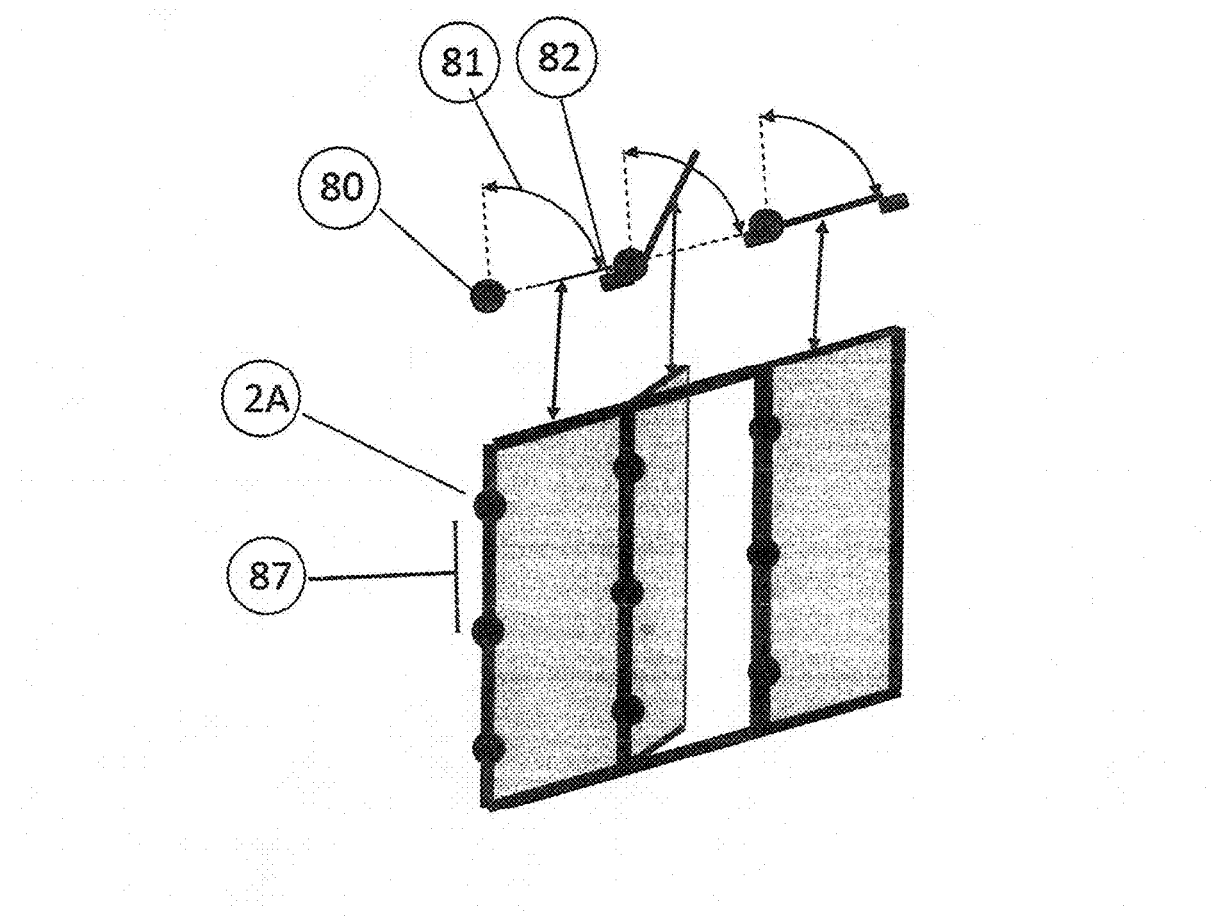
Fig. 15 Moving Window Frame with Three Vertical Windows, Wind Application

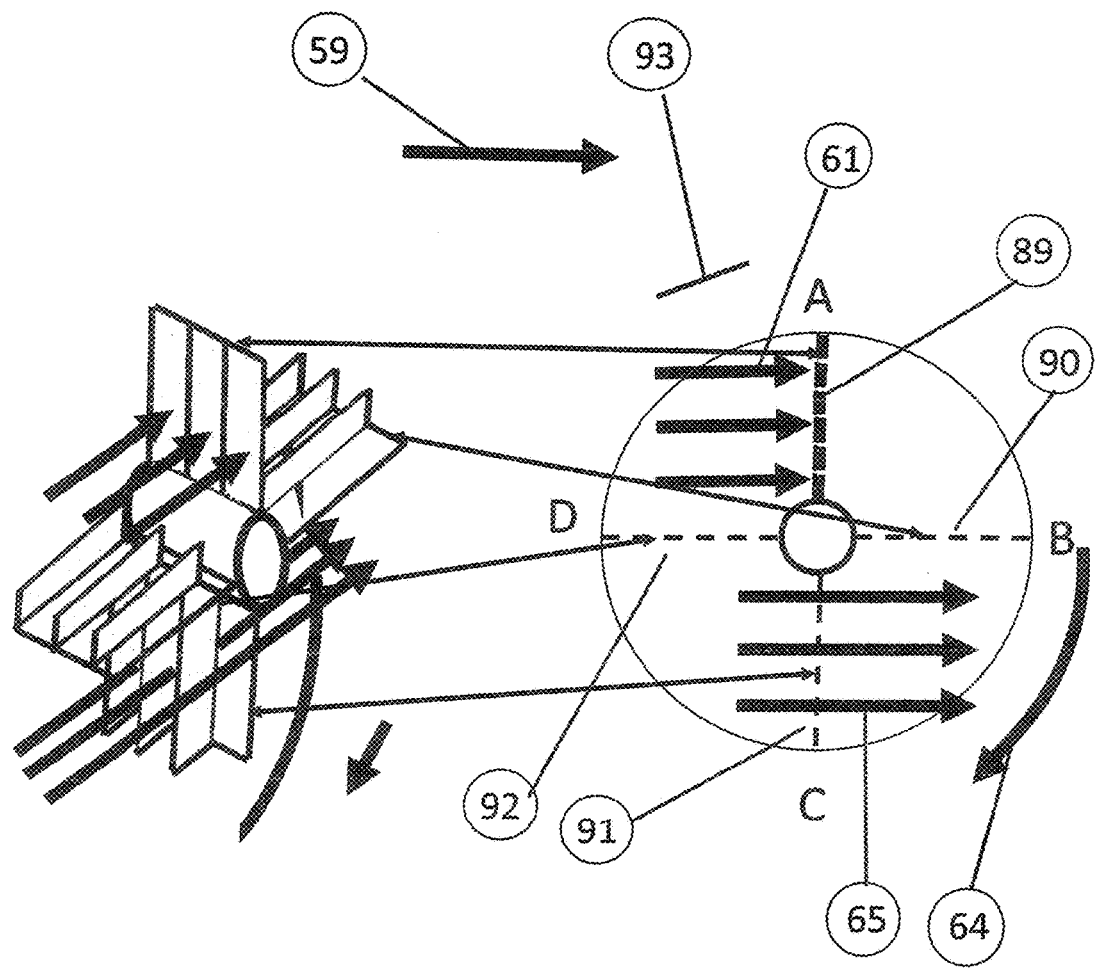
Fig. 16 Wind Blow from Left to Right, Vertical

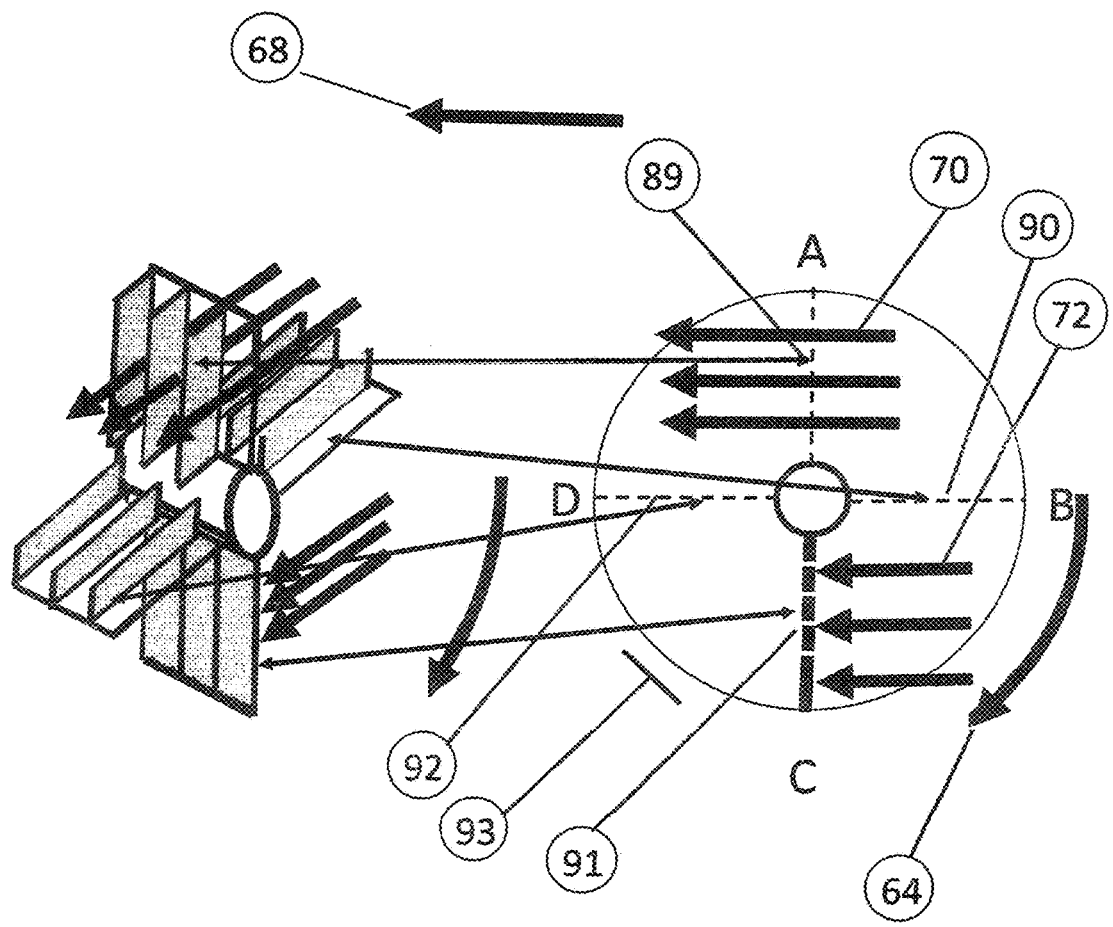
Fig. 17 Wind Blow from Right to Left, Vertical

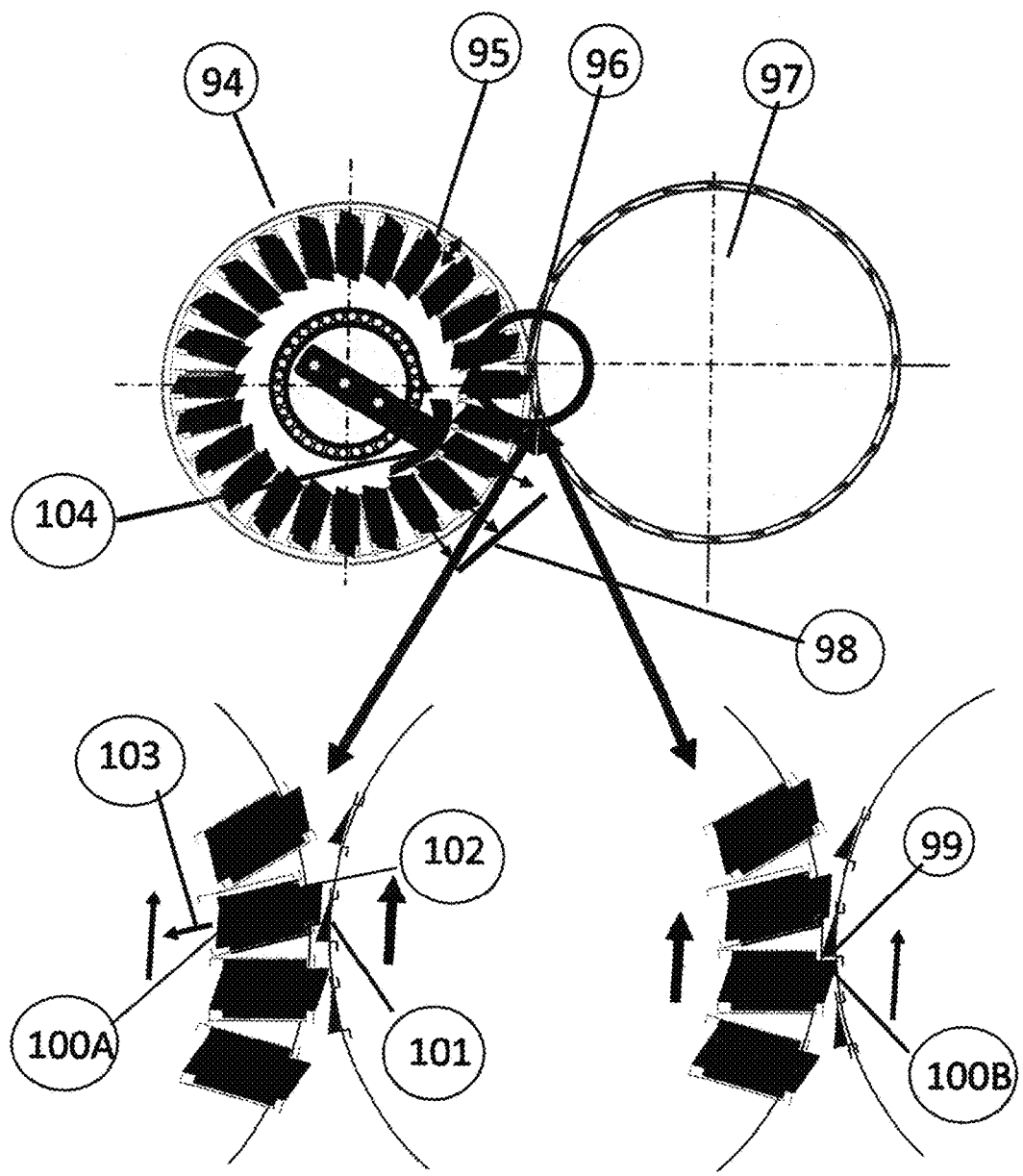
Fig. 18 Special Clutch

MOVING WINDOW FRAME WITH MULTIPLE WINDOWS AND ITS APPLICATION IN THE OCEAN, RIVER, AND WIND

The function of this invention is to convert the energy embedded in the water in motion into electricity. This invented device has Moving-Window-Frames, Vertical Windows, Horizontal Window, Top-Covering-Tunnel, Bottom-Covering-Tunnel, Energy Collection Drum, Conveyor Belt Structure, Sprockets, Sprocket Chains, Gears, Sprocket Belts, Flywheels, and Electricity Generators. Detail of each part will be explained in the following:

SUMMARY OF INVENTION

A Moving-Window-Frame with Multiple Windows is invented, and it is applied in electricity generation from the water in motion or wind. The machine parts involved are: Moving-Window-Frames, Vertical Windows, Horizontal Window, Top-Covering-Tunnel, Bottom-Covering-Tunnel, Energy Collection Drum, Conveyor Belt Structure, Sprockets, Sprocket Chains, Gears, Gear Belts, Special Clutch, Flywheels, and Electricity Generators.

Two types of Moving-Window-Frames are invented: The first one which is to be used in electricity generation from the water in motion is a Moving-Window-Frame with Multiple Vertical Windows and one Horizontal Window, and the second one which is to be used to generate electricity from wind is a Moving-Window-Frame with Multiple Vertical Windows alone (No Horizontal Window). These windows are used as described below:

The top of the Conveyor Belt Structure is covered with the Top-Covering-Tunnel, and the bottom part is covered with the Bottom-Covering-Tunnel. Both ends of the Top-Covering-Tunnel and Bottom-Covering-Tunnel are all opened and let the water flow in and out. The Moving-Window-Frames are attached to the conveyor belt with fixtures.

When the water flows in one direction (for example from left to right), the water mass pushes and closes the Vertical Windows installed on the Moving-Window-Frames in the Top-Covering-Tunnel and moves the Moving-Window-Frames in the direction of the water flow, consequently the Conveyor Belt also moves in the direction of the water flow (to the right), but the Vertical Windows of the Moving-Window-Frames in the Bottom-Covering-Tunnel are pushed opened and the water passes through. Thus, a torque is created between top part of the conveyor belt and bottom part of the conveyor belt and it causes the conveyor belt to rotate in clockwise rotation.

When the water flows in the other direction (from right to left), the water mass opens the Vertical Windows of the Moving-Window-Frames in the Top-Covering-Tunnel and the water passes through the Top-Covering-Tunnel, but in the Bottom-Covering-Tunnel the water mass pushes and closes the Vertical Windows and Horizontal Window of the Moving-Window-Frames and moves the Moving-Window-Frames in the direction of the water flow, consequently the Conveyor Belt also moves in the direction of the water flow (to the left). Thus, a torque is created between the top part of the conveyor belt and the bottom part of the conveyor belt and it causes the conveyor belt to rotate in clockwise rotation again.

The rotational energy is to be stored in a flywheel and the rotational energy stored in the flywheel is to be used to rotate electricity generator spin axis to generate electricity.

Similar operational principle is applied to the case of generating electricity from the wind.

Results of Early Search

U.S. Patent Document

TABLE-US-00001 U.S. Pat. No. 7,478,974 Jan. 20, 2009 Kelly 405/78 U.S. Pat. No. 7,299,628 Nov. 27, 2007 Buller 60/398 U.S. Pat. No. 7,084,521 Aug. 1, 2006 Martin 290/54 U.S. Pat. No. 6,861,766 Mar. 1, 2005 Rembert 290/43 U.S. Pat. No. 6,396,162 May 28, 2002 Carrillo 290/43 U.S. Pat. No. 6,109,863 Aug. 29, 2000 Milliken 415/1 U.S. Pat. No. 6,023,105 Feb. 8, 2000 Youssef 290/54 U.S. Pat. No. 4,818,888 Apr. 4, 1989 Lenoir, III 290/43 U.S. Pat. No. 4,270,056 May 26, 1981 Wright 290/54 U.S. Pat. No. 4,224,527 Sep. 23, 1980 Thompson 290/54

BRIEF DESCRIPTION OF DRAWINGS

FIG. 1A Moving-Window-Frame Structure with Multiple Vertical Windows and One Horizontal Window:

It shows a structure of the Moving-Window-Frame that has multiple vertical windows and one horizontal window.

FIG. 1B Moving-Window-Frame Structure with Multiple Vertical Windows and No Horizontal Window:

It shows a structure of the Moving-Window-Frame that has multiple vertical windows and no horizontal window.

FIG. 2 Moving-Window-Frame Structure in the Ocean Wave Application

The Moving-Window-Frame Structure with two Vertical Windows and a Horizontal Window is shown with hinges and stopper locations. It also shows the range of angular rotation of the Vertical Windows (180 deg) and Horizontal Window (90 deg).

FIG. 3 Ocean Wave Energy Converter Structure:

It shows Energy Converter Structure that is covered by tunnel in the top portion as well as in the bottom portion of the structure. The nozzles at both sides increase the wave speed.

FIG. 4 Ocean Wave Motion from Left to Right:

It shows the total structure assembled and shows what is happening when the water flows from left to right. The conveyor belt rotates in clockwise rotation.

FIG. 5 No Wave Motion:

It shows what is happening when the water is not flowing. The conveyor belt stops rotating.

FIG. 6 Water Motion from Right to Left:

It shows what is happening when the water flows from right to left. The conveyor belt rotates in clockwise rotation again FIG. 7 Moving-Window-Frame without Horizontal Window It shows that without the Horizontal Window, the system will not work.

FIG. 8 Moving-Window-Frame with Horizontal Window

It shows that with the Horizontal Window, the system will work.

FIG. 9 Wind Energy Converter Structure

It shows the top and side view of the Wind Energy Converter Structure including the base which is allowed to rotate 180 degrees to collect the wind energy flowing in 360 degrees.

FIG. 10 Wind Blow from Left to Right

It shows that when the wind blows from left to right, the Moving-Window-Frames are rotating in clockwise rotation.

FIG. 11 Wind Blow from Right to Left

It shows that when the wind blows from right to left, the Moving-Window-Frames are rotating in clockwise rotation again.

FIG. 12 Moving-Window-Frame with Two Vertical Windows (to be used in FIG. 14 and FIG. 15)

It shows a Moving-Window-Frame with two Vertical Windows to be used in generating electricity from the ocean waves. No Horizontal Window is used.

FIG. 13 Ocean Wave Motion from Left to Right, Vertical Window

It shows what is happening when the ocean waves flow from left to right and when the Moving-Window-Frames with Two Vertical Windows are used. It rotates in clockwise rotation.

FIG. 14 Ocean Wave Motion from Right to Left, Vertical Window

It shows what is happening when the ocean waves flow from right to left and when the Moving-Window-Frames with Two Vertical Windows are used. It rotates in clockwise rotation again.

FIG. 15 Moving-Window-Frame with Three Vertical Windows, Wind Application

It shows a Moving-Window-Frame with Three Vertical Windows which is to be used in generating electricity from the wind.

FIG. 16 Wind Blow from Left to Right, Vertical Window

It shows what is happening when the wind blows from left to right and when the Moving-Window-Frames with Three Vertical Windows are used. It rotates in clockwise rotation.

FIG. 17 Wind Blow from Right to Left, Vertical Window

It shows what is happening when the wind blows from right to left and when the Moving-Window-Frames with Three Vertical Windows are used. It rotates in clockwise rotation again.

FIG. 18 Special Clutch

It shows a Special Clutch the function of which is to transfer the rotational energy from one sprocket to another sprocket if the one sprocket rotates faster than the other sprocket. If the one sprocket rotates slower than the other sprocket, then no rotational energy transfer takes place.

DETAILED DESCRIPTION OF THE INVENTION

A Moving-Window-Frame with Multiple Windows is invented, and it is applied in electricity generation from the water in motion or wind. The machine parts involved are: Moving-Window-Frames, Vertical Windows, Horizontal Window, Top-Covering-Tunnel, Bottom-Covering-Tunnel, Energy Collection Drum, Conveyor Belt Structure, Sprockets, Sprocket Chains, Gears, Gear Belts, Special Clutch, Flywheels, and Electricity Generators.

Two types of Moving-Window-Frames are invented: The First one which is to be used in electricity generation from the water in motion is Moving-Window-Frame with Multiple Vertical Windows and one Horizontal Window (see FIG. 1A) and the second one which is to be used to generate electricity from wind is Moving-Window-Frames with Multiple Vertical Windows alone (FIG. 1B. No Horizontal Window). Detail of each part will be explained in the following:

FIG. 1A shows the basic structure of the Moving-Window-Frame (MWF, 1) with multiple vertical windows and one horizontal window. Here, it shows only three vertical widows: Vertical Window-1 (VW1,4), Vertical Window-2 (VW2,6), and Vertical Window-3 (VW3,8). There is only one Horizontal Window (HW, 10). Each window has Hinges (2) and Stoppers (3). All vertical windows are allowed to rotate 180 degree (5, 7, and 9) as shown in the figure. The horizontal window, HW (10), is allowed to rotate 90 degree. The reason for this configuration will be explained in FIG. 7 and FIG. 8.

FIG. 1B shows the basic structure of the Moving-Window-Frame with multiple vertical windows without horizontal window.

FIG. 12 through FIG. 17 show the application of the Moving-Window-Frame with multiple vertical windows without horizontal window.

The number of vertical windows that is needed in the ocean or river application will be less than the number of vertical windows in wind application.

Ocean or River Application

FIG. 2 shows the Moving-Window-Frame (MWF, 1). It has three windows: Vertical Window-1 (VW1, 6), Vertical Widow-2 (VW2, 8), and Horizontal Window (HW, 10). Each window has Hinges (2) and Stoppers (3). The VW1 (6) is allowed to rotate 180 degrees as shown (7). The VW2 (8) is also allowed to rotate 180 degrees as shown (9). The HW (10) is allowed to rotate 90 degrees as shown (11).

FIG. 3 shows the ocean wave energy converter structure frame. The structure has nozzles (NZ, 12) at both ends. They are to increase the speed of the waves as the waves flow into the energy converter structure. The structure is partially covered with Top-Covering-Tunnel (TCT, 14) in the top area and Bottom-Covering-Tunnel (BCT, 18) in the bottom area. In addition, the energy converter structure has EGB (13), Rotating Wheels (16), Conveyor Belt (15), and Supporting Structure (17). The EGB (13, Electricity Generation Box) contains gears, belts, sprockets, sprocket chains, flywheel, and electricity generator.

FIG. 4 shows the total structure of the invention except the Nozzles (12). It is seen here that 8 MWFs (1) are installed on Conveyor Belt (15) and fixed on the Conveyor Belt (15) with Fastening Fixtures (29). The dimension of the MWF (1) is very close to the dimension of the cross section of the tunnels such that it can travel through the tunnels but at the same time blocks the water flow. As the water flows from left to right (19), all VW1s (6) and VW2s (8) of all three MWFs (1) inside the TCT (14) are all closed by the water pressure and the mass of water confined in the Top-Covering-Tunnel (14) pushes all three MWFs (1) to the right while all VW1s (6) and VW2s (8) of all three MWFs (1) inside the BCT (18) are pushed open (25,26) by the water pressure such that the water can pass through (24) the BCT (18) and no pressure can be built up in the BCT (18). The force imbalance between the top side of the conveyor belt and the bottom side of the conveyor belt occurs and as a consequence, the sprocket (23) rotates in clockwise rotation as shown in the figure (27). All VW1s(6), VW2s(8), and HWs (10) in the BCT (18) are remained in their horizontal position (25,26).

FIG. 5 depicts a situation in which the water stops flowing, and the Rotating Wheel (31) stops rotating.

FIG. 6 explains what is happening as the Water (33) starts flowing from right to left. All HW1s (6) and HW2s (8) of all three MWFs (1) inside the TCT (14) are pushed open by the water pressure and the water mass passes through (32) the TCT (14) and no kinetic energy can be built up in the TCT (14) while all HW1s (6), HW2s (8), and HW (10) of all three MWFs (1) inside the BCT (18) are all closed by the water pressure and the mass of water confined in the BCT (18) pushes all three MWFs (1) to the left such that the force imbalance between the top side of the conveyor belt and the bottom side of the conveyor belt occurs and as a consequence, the Sprocket (35) rotates in clockwise rotation again as shown in the figure.

Thus, combining the FIG. 4 and FIG. 6, it shows that the bi-directional (i.e., back and forth) water motion like the ocean wave or unidirectional water like river flow can be converted into clockwise rotation. The energy in the clockwise rotation is stored in a Flywheel (37) and then the stored energy is used to rotated a generator spin axis (36) and generate electricity.

Note that the height of the BCT (18) is higher than that of the TCT (14) and thus, the BCT (18) can accommodate three windows that are in vertical position and the water mass pushes all HW1s(6), HW2s (8) and HWs (10) in the BCT (18) to the left and it causes the Sprocket (35) to rotate in the clockwise rotation. FIG. 7 and FIG. 8 explain the reason for needing the HW (10) more detail.

FIG. 7 shows a case when there is no HW (10). Inside BCT (18), the HW1 (6) swung 180 degrees downward (39) and the HW2 (8) also swung 180 degrees downward (38). The result is that it generates an open space (41) through which the water can pass through and no pressure can be built up inside BCT (18).

The open space (41) occurs as the direction of the water flow changes from one direction (e.g. from left to right) to its opposite direction (e.g. from right to left). At the moment of direction change, the water flow speed becomes zero, and at that moment, the HW1 (6) swings 180 degrees downward (39) and the HW2 (8) also swings 180 degrees downward (38). Thus, the open space (41) is generated as shown in FIG. 7.

However, having the HW (10) as shown in FIG. 8, the HW (10) swings 90 degrees downward (43) and closes the open space (41) as shown (46) in FIG. 8. Thus, the water mass can push all the three MWFs (1) in the BCT (18) to the left, and it causes the Rotating Wheel (35) in FIG. 6 to rotate in clockwise rotation.

Bottom Cover (42) of the BCT (18) and the sprocket Chain (40) are drawn in to show the position of the MWF (1) with respect to them (see FIG. 7).

One other notable advantage of the multiple swinging windows is that it minimizes the resisting force by the WV1 (6), WV2 (8), and HW (10) against the water flow around the four corner sections (34 in FIG. 6).

Wind Application

FIG. 9 shows a wind energy converter structure. Energy Collection Drum (ECD, 48) will be explained in FIG. 10 and FIG. 11. It has MWFs (1) to collect the energy. Nozzles (56) are installed to increase the wind energy. The rotational energy generated inside ECD (48) is transferred to Flywheel (49) and the stored rotational energy in the Flywheel (49) rotates the generator spin axis to generate electricity. It can collect energy from the wind the direction of which varies 360 degree. The advantage of this technology is that it needs to rotate only 180 degree (57) to collect the energy from the wind the direction of which varies 360 degree. The Round Table (47) is placed on Ball Bearings (51) and whole system is to be rotated by the Gear (53) and Control System (52). Wind direction sensor (not shown here) is to sense the wind direction and generate wind direction signal to control the Control System (52) and optimize the energy collection.

FIG. 10 shows a case when the wind blows from left to right (59). All the horizontal windows in the MWF (1) at A (62) are closed by the wind pressure (61) and the wind pushes the MWF (1) at A (62) to the right while the horizontal windows of MWF (1) at B (63), MWF (1) at C (66), and MWF (1) at D (67) are all opened by the wind pressure and let the wind pass through them (65). Thus, a torque is generated and the Energy Converter Wing Set (60) rotates in clockwise rotation (64).

FIG. 11 shows a case when the wind blows from right to left (68). All the horizontal windows and Horizontal Window (76) in the MWF (1) at C (75) are closed by the wind pressure (72) and the wind pushes the MWF (1) at C (75) to the left while the horizontal windows of MWF (1) at A (69), MWF (1) at B (71), and MWF (1) at D (78) are all opened by the wind pressure and let the wind pass through them (70). Thus, a torque is generated and the Energy Converter Wing Set (77) rotates in clockwise rotation (73) again.

Thus, combining FIG. 10 and FIG. 11, the Energy Converter Wing Set rotates in the clockwise rotation only regardless which direction the wind blows. That is, whether the wind blows from left to right or from right to left, the Energy Converter Wing Set rotates in the clockwise rotation all the time.

This property is very useful in collecting energy from winds blowing in any direction in 360 degrees. Because of this property, the Wind Energy Converter needs to rotate only 180 degrees to collect the energy from winds blowing in any direction in 360 degrees. Note that the Horizontal Window (74) is rotated 180 degrees and it appears that the length of the MWF (1) C is longer than the length of other MWF (1).

FIG. 12 shows Moving-Window-Frame with two Vertical Windows (MWFVW, 83) to be used in ocean or river application as shown in FIG. 14. It has Hinges (80) and Stoppers (82). The Vertical Window 1 (VW1, 84) and Vertical window 2 (VW2, 85) are allowed to rotate less than 90 degree (81) as shown in the Figure.

FIG. 13 shows the total structure of the invention except the Nozzles (12). It is seen here that 8 MWFVWs (83) are installed on Conveyor Belt (15) and fixed on the Conveyor Belt (15) with Fastening Fixtures (29). The dimension of the MWFVW (83) is very close to the dimension of the cross section of the tunnels such that it can travel through the tunnels but at the same time blocks the water flow. As the water flows from left to right (19), all VW1 (84) and VW2 (85) of all three MWFVWs (83) inside the TCT (14) are all closed by the water pressure and the mass of water confined in the Top-Covering-Tunnel (14) pushes all three MWFVWs (83) to the right while all VW1 (84) and VW2 (85) of all three MWFVWs (83) inside the BCT (18) are pushed open (25, 26) by the water pressure such that the water can pass through (24) the BCT (18) and no pressure can be built up in the BCT (18). The force imbalance between the top side of the conveyor belt and the bottom side of the conveyor belt occurs and as a consequence, the sprocket (23) rotates in clockwise rotation as shown in the FIG. 27. All VW1 (84), VW2 (85) in the BCT (18) are remained in their opened position (86).

FIG. 14 explains what is happening as the Water (33) starts flowing from right to left. All VW1 (84) and VW2 (85) of all three MWFVWs (83) inside the TCT (14) are pushed open by the water pressure and the water mass passes through (32) the TCT (14) and no pressure can be built up in the TCT (14) while all VW1 (84) and VW2 (85) of all three MWFVWs (83) inside the BCT (18) are all closed by the water pressure and the mass of water confined in the BCT (18) pushes all three MWFVWs (83) to the left such that the force imbalance between the top side of the conveyor belt and the bottom side of the conveyor belt occurs and as a consequence, the Sprocket (35) rotates in clockwise rotation again as shown in the figure.

Thus, combining the FIG. 14 and FIG. 15, it shows that the bi-directional (i.e., back and forth) water motion like the ocean wave or unidirectional water flow like river flow can be converted into clockwise rotation. The energy in the clockwise rotation is stored in a Flywheel (37) and then the stored energy is used to rotated a generator spin axis (36) and generate electricity.

One other notable advantage of the multiple swinging windows is that it minimizes the resisting force by the VW1 (84), VW2 (85) against the water flow around the four corner sections (34 in FIG. 6).

Wind Application

FIG. 15 shows wind application of the Moving-Window-Frame with Vertical Windows but not with Horizontal Window (MWFVW, 87).

FIG. 9 shows a wind energy converter structure. Energy Collection Drum (ECD, 48) will be explained in FIG. 17 and FIG. 18. Nozzles (56) are installed to increase the wind energy. The rotational energy generated inside ECD (48) is transferred to Flywheel (49) and the stored rotational energy in the Flywheel (49) rotates the generator spin axis to generate electricity. It can collect energy from the wind the direction of which varies 360 degree. The advantage of this technology is that it needs to rotate only 180 degree (57) to collect the energy from the wind the direction of which varies 360 degree. The Round Table (47) is placed on Ball Bearings (51) and whole system is to be rotated by the Gear (53) and Control System (52). Wind direction sensor (not shown here) is to sense the wind direction and generate wind direction signal to control the Control System (52) and optimize the energy collection.

FIG. 16 shows a case when the wind blows from left to right (59). All the vertical windows at A (89) are closed by the wind pressure (61) and the wind pushes the windows at A (89) to the right while the vertical windows at B (90), at C (91), and at D (92) are all opened by the wind pressure and let the wind pass through them (65). Thus, a torque is generated between at A (89) and at C (91), and the Energy Converter Wing Set (93) rotates in clockwise rotation (64).

FIG. 17 shows a case when the wind blows from right to left (68). All the vertical windows at C (91) are closed by the wind pressure (72) and the wind pushes the windows at C (91) to the left while the vertical windows at A (89), at C (90), and at D (92) are all opened by the wind pressure and let the wind pass through them (72). Thus, a torque is generated between at A (89) and at C (91), and the Energy Converter Wing Set (93) rotates in clockwise rotation (64).

Thus, combining FIG. 17 and FIG. 18, the Energy Converter Wing Set rotates in the clockwise rotation only regardless which direction the wind blows. That is, whether the wind blows from left to right or from right to left, the Energy Converter Wing Set rotates in the clockwise rotation all the time.

This property is very useful in collecting energy from winds blowing in any direction in 360 degrees. Because of this property, the Wind Energy Converter needs to rotate only 180 degrees to collect the energy from winds blowing in any direction in 360 degrees.

FIG. 18 is a Special Clutch the function of which is to pick up the energy from the ocean Waves or river flow when the Input Sprocket (94) rotates faster than the Receiving Sprocket (97). The expansion of the teeth contact (96) is shown in the bottom right. It is shown that the Tooth (99) pushes the Tooth (98) and it causes the Receiving Sprocket (97) to rotate in clockwise rotation. But if the wave kinetic energy is low and the rotation rate of the Input Sprocket (94) is slower than that of the Receiving Sprocket (97), then the Input Sprocket (94) does not provide any energy into the Receiving Sprocket (97). It is shown in the bottom left that since Input Sprocket (94) rotates slower than that of the Receiving Sprocket (97), the Tooth (101) pushes the Tooth (102) toward the center of the Input Sprocket (94) and slips by. The tooth pushed inwardly will be pushed back to the previous position (99) by the Cam (100).

What is claimed is:

1. A system for generating electricity from water flow in a body of water, the system comprising:

a support structure fixed to a floor of the body of water, the support structure having a longitudinal axis substantially aligned with a direction of the water flow;

two pairs of wheels rotatably attached to the support structure, the pairs of wheels being respectively disposed at opposite ends of the support structure, with one pair of wheels being operably connected to an electricity generator;

a conveyor belt wound around and supported by the rotatable wheels, the wheels allowing the conveyor belt to move along a specified conveyor belt path, the conveyor belt having an exposed face with a plurality of equally-spaced window frames fastened tangentially thereto, the window frames extending outwardly from the conveyor belt;

a top-covering tunnel located on a top side of the support structure, the top-covering tunnel covering the top side of the conveyor belt;

a bottom-covering tunnel located on a bottom side of the support structure, the bottom-covering tunnel covering the bottom side of the conveyor belt;

the top-covering tunnel and the bottom-covering tunnel each formed by two side walls and an outer wall, to allow water flow only through the opposite ends of each respective tunnel;

an upper nozzle located at one of the opposite ends of the support structure, the upper nozzle formed as a truncated pyramid to funnel and direct incoming water flow from a first direction into the top-covering tunnel;

a lower nozzle located at the other opposite end of the support structure, the lower nozzle formed as a truncated pyramid to funnel and direct incoming water flow from a second direction into the bottom-covering tunnel, the second direction being aligned with and opposite to the first direction;

wherein each window frame comprises two window panels arranged end-to-end in a direction tangential to the exposed face of the conveyor belt, the window panels being hingedly mounted to the respective window frame, the hinged mounting allowing each window panel to rotate within a maximum range of 180 degrees, with stoppers fixed to each window frame, the stoppers acting to prevent rotation of each window panel past the maximum range of rotation;

the window panels each having a respective face side to intercept a directed water flow from one of the nozzles such that, when the directed water flow is in a same direction as the specified conveyor belt path, the directed water flow impinges upon the face sides of the window panels to thereby exert a force on the face sides to close the window panels and transfer the force to the conveyor belt to cause the belt to move along the specified conveyor belt path, the window panels each having a respective back side, opposite the respective face side, such that, when an incoming water flow is in a direction opposite to the specified conveyor belt path, the window panels are pushed open and allow the incoming water flow to freely pass through the window frame, to thereby minimize a force from the incoming water flow on the window panels in the direction opposite to the specified conveyor belt path;

wherein the movement of the conveyor belt drives the electricity generator to generate the electricity.

* * * * *